United States Patent
George et al.

(10) Patent No.: US 7,424,441 B2
(45) Date of Patent: Sep. 9, 2008

(54) SYSTEMS AND METHODS FOR INTEGRATING LOYALTY AND STORED-VALUE PROGRAMS

(75) Inventors: Colleen George, Centennial, CO (US); John Cawthorne, Doylestown, PA (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 783 days.

(21) Appl. No.: 10/740,378

(22) Filed: Dec. 17, 2003

(65) Prior Publication Data

US 2004/0186773 A1 Sep. 23, 2004

Related U.S. Application Data

(63) Continuation-in-part of application No. 10/079,927, filed on Feb. 19, 2002.

(51) Int. Cl.
*G06Q 30/00* (2006.01)

(52) U.S. Cl. .............................. 705/14; 705/35; 705/39; 705/16; 705/17; 235/381

(58) Field of Classification Search .................... 705/14; 235/80, 380; 707/104.1
See application file for complete search history.

(56) References Cited

U.S. PATENT DOCUMENTS

| | | | |
|---|---|---|---|
| 4,723,212 A | 2/1988 | Mindrum et al. |
| 4,910,672 A | 3/1990 | Off et al. |
| 4,941,090 A | 7/1990 | McCarthy |
| 5,025,372 A | 6/1991 | Burton et al. |
| 5,056,019 A | 10/1991 | Schultz et al. |
| 5,117,355 A | 5/1992 | McCarthy |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,305,196 A | 4/1994 | Deaton et al. |
| 5,448,471 A | 9/1995 | Deaton et al. |
| 5,471,669 A | 11/1995 | Lidman |
| 5,483,444 A | 1/1996 | Heintzeman et al. |
| 5,530,232 A | 6/1996 | Taylor |

(Continued)

FOREIGN PATENT DOCUMENTS

EP 0253240 A1 1/1988

(Continued)

OTHER PUBLICATIONS

US 6,460,019, 10/2002, Walker et al. (withdrawn)

*Primary Examiner*—Andrew J. Fischer
*Assistant Examiner*—Evens J. Augustin
(74) *Attorney, Agent, or Firm*—Townsend and Townsend and Crew LLP

(57) ABSTRACT

Systems and methods are provided for operating an integrated stored-value and loyalty program within a financial infrastructure. An identifier and a packet of transaction information defining a transaction between a merchant and a customer are received at a loyalty host. Qualifying aspects of the transaction are identified from the packet of transaction information. A customer reward is determined from the identified qualifying aspects and a history of information defined by the identifier. Information defining the reward is transmitted to a stored-value host that records a value parameter that may be applied as value by the customer to another transaction.

18 Claims, 10 Drawing Sheets

U.S. PATENT DOCUMENTS

| | | | |
|---|---|---|---|
| 5,537,314 | A | 7/1996 | Kanter |
| 5,578,808 | A | 11/1996 | Taylor |
| 5,612,868 | A | 3/1997 | Off et al. |
| 5,642,485 | A | 6/1997 | Deaton et al. |
| 5,644,723 | A | 7/1997 | Deaton et al. |
| 5,649,114 | A | 7/1997 | Deaton et al. |
| 5,659,469 | A | 8/1997 | Deaton et al. |
| 5,687,322 | A | 11/1997 | Deaton et al. |
| 5,689,100 | A * | 11/1997 | Carrithers et al. ........... 235/380 |
| 5,734,838 | A * | 3/1998 | Robinson et al. .............. 705/14 |
| 5,774,870 | A | 6/1998 | Storey |
| 5,804,806 | A | 9/1998 | Haddad et al. |
| 5,806,045 | A * | 9/1998 | Biorge et al. .................. 705/14 |
| 5,832,457 | A | 11/1998 | O'Brien et al. |
| RE36,116 | E | 2/1999 | McCarthy |
| 5,909,486 | A | 6/1999 | Walker et al. |
| 5,915,007 | A | 6/1999 | Klapka |
| 5,923,016 | A | 7/1999 | Fredregill et al. |
| 5,924,080 | A | 7/1999 | Johnson |
| 5,926,795 | A | 7/1999 | Williams |
| 5,956,695 | A * | 9/1999 | Carrithers et al. .............. 705/14 |
| 5,969,318 | A | 10/1999 | Mackenthun |
| 5,974,399 | A | 10/1999 | Giuliani et al. |
| 5,983,196 | A | 11/1999 | Wendkos |
| 5,991,376 | A | 11/1999 | Hennessy et al. |
| 6,000,608 | A | 12/1999 | Dorf |
| 6,009,411 | A | 12/1999 | Kepecs |
| 6,009,412 | A | 12/1999 | Storey |
| 6,012,635 | A | 1/2000 | Shimada et al. |
| 6,024,288 | A | 2/2000 | Gottlich et al. |
| 6,026,370 | A | 2/2000 | Jermyn |
| 6,032,136 | A | 2/2000 | Brake, Jr. et al. |
| 6,061,660 | A | 5/2000 | Eggleston et al. |
| 6,070,147 | A * | 5/2000 | Harms et al. .................. 705/14 |
| 6,119,933 | A * | 9/2000 | Wong et al. .................. 235/380 |
| 6,138,911 | A | 10/2000 | Fredregill et al. |
| 6,179,206 | B1 * | 1/2001 | Matsumori ................. 235/383 |
| 6,189,787 | B1 | 2/2001 | Dorf |
| 6,195,644 | B1 | 2/2001 | Bowie |
| 6,222,914 | B1 | 4/2001 | McMullin |
| 6,229,879 | B1 | 5/2001 | Walker et al. |
| 6,278,979 | B1 | 8/2001 | Williams |
| 6,282,516 | B1 | 8/2001 | Giuliani |
| 6,292,786 | B1 | 9/2001 | Deaton et al. |
| 6,321,210 | B1 | 11/2001 | O'Brein et al. |
| 6,334,108 | B1 | 12/2001 | Deaton et al. |
| 6,345,261 | B1 * | 2/2002 | Feidelson et al. ............. 705/14 |
| 6,351,735 | B1 | 2/2002 | Deaton et al. |
| 6,377,935 | B1 | 4/2002 | Deaton et al. |
| 6,409,080 | B2 | 6/2002 | Kawagishi |
| 6,419,161 | B1 | 7/2002 | Haddad et al. |
| 6,424,949 | B1 | 7/2002 | Deaton et al. |
| 6,450,407 | B1 | 9/2002 | Freeman et al. |
| 6,516,302 | B1 * | 2/2003 | Deaton et al. ................. 705/14 |
| 6,549,912 | B1 * | 4/2003 | Chen ....................... 707/104.1 |
| 6,889,198 | B2 * | 5/2005 | Kawan ........................ 705/14 |
| 7,085,774 | B2 * | 8/2006 | Shah et al. ................. 707/104.1 |
| 2001/0025879 | A1 | 10/2001 | Kawagishi |
| 2001/0054003 | A1 * | 12/2001 | Chien et al. .................. 705/14 |
| 2002/0046116 | A1 | 4/2002 | Hohle et al. |
| 2002/0065712 | A1 | 5/2002 | Kawan |
| 2002/0065716 | A1 | 5/2002 | Kushchill |
| 2002/0082920 | A1 | 6/2002 | Austin et al. |
| 2002/0099601 | A1 | 7/2002 | Farrell |
| 2002/0107797 | A1 | 8/2002 | Combaluzier |
| 2002/0112236 | A1 | 8/2002 | Sukeda et al. |
| 2002/0120514 | A1 | 8/2002 | Hagmeier et al. |
| 2002/0123926 | A1 | 9/2002 | Bushold et al. |
| 2002/0143626 | A1 | 10/2002 | Voltmer et al. |

FOREIGN PATENT DOCUMENTS

| | | |
|---|---|---|
| EP | 0933717 A2 | 8/1999 |
| EP | 0 987 642 A2 | 3/2000 |
| EP | 1011060 A1 | 6/2000 |
| EP | 0933717 A3 | 2/2001 |
| EP | 1139252 A2 | 10/2001 |
| EP | 1232776 A2 | 8/2002 |
| EP | 1386268 (A2) * | 2/2004 |
| GB | 2274349 A | 7/1994 |
| WO | WO 93/08546 A1 | 4/1993 |

* cited by examiner

SYSTEMS AND METHODS FOR INTEGRATING LOYALTY AND STORED-VALUE PROGRAMS

CROSS-REFERENCES TO RELATED APPLICATIONS

This application is a continuation-in-part application of U.S. patent application Ser. No. 10/079,927, entitled "SYSTEMS AND METHODS FOR OPERATING LOYALTY PROGRAMS," filed Feb. 19, 2002 by Colleen George and John Cawthorne (sometimes referred to herein as "the parent application"), the entire disclosure of which is incorporated herein by reference for all purposes.

This application is also related to the following commonly assigned U.S. Patent Applications, the entire disclosure of each of which is also incorporated herein by reference for all purposes: U.S. patent application Ser. No. 09/971,303, entitled "STORED VALUE CARDS AND METHODS FOR THEIR ISSUANCE," filed Oct. 3, 2001 by Kevin A. James et al.; U.S. patent application Ser. No. 10/371,167, entitled "METHODS AND SYSTEMS FOR COORDINATING A CHANGE IN STATUS OF STORED-VALUE CARDS," filed Feb. 21, 2003 by David R. Baumgartner; U.S. patent application Ser. No. 10/421,604, entitled "MULTI-PURSE CARD SYSTEM AND METHODS," filed Apr. 22, 2003 by Kenneth Algiene; U.S. patent application Ser. No. 10/405,043, entitled "METHODS AND SYSTEMS FOR PROCESSING UNRESTRICTED STORED-VALUE INSTRUMENTS," filed Mar. 31, 2003 by Christopher McGee and David R. Baumgartner; U.S. patent application Ser. No. 10/286,006, entitled "STORED VALUE CURRENCY CONVERSION SYSTEMS AND METHODS," filed Nov. 1, 2002 by Kevin A. James et al.; U.S. patent application Ser. No. 10/356,207, entitled "ACH SETTLEMENT SYSTEMS AND METHODS," filed Jan. 30, 2003 by David R. Baumgartner et al.; U.S. patent application Ser. No. 10/267,180, entitled "ELECTRONIC CARD AND TICKET AND METHODS FOR THEIR USE," filed Oct. 8, 2002 by Christopher McGee et al.; U.S. patent application Ser. No. 10/268,040, entitled "DISCOUNT-INSTRUMENT METHODS AND SYSTEMS," filed Oct. 8, 2002 by Christopher McGee et al.; and U.S. patent application Ser. No. 10/245,784, entitled "METHOD AND SYSTEM FOR MERCHANT PROCESSING OF PURCHASE CARD TRANSACTIONS WITH EXPANDED CARD TYPE ACCEPTANCE," filed Sep. 17, 2002 by Allen C. Strayer et al.

BACKGROUND OF THE INVENTION

This application relates generally to consumer transactions. More specifically, this application relates to operating loyalty programs in connection with consumer transactions.

In recent years, there has been a steady proliferation of loyalty programs offered to consumers. There are a variety of different models on which such loyalty programs are based, but a common feature of all is that they offer an incentive designed to encourage customers to conduct business preferentially with one organization rather than with competitor organizations. For example, such loyalty systems often take the form of point systems in which a customer is credited with a number of points for each transaction and is entitled to exchange certain numbers of points for goods and/or services.

A prototypical example of such a loyalty system is used in the airline industry. An airline typically offers some number of points to each consumer that is correlated with the distance traveled. At certain levels, the points may be exchanged by the consumer for airline tickets; generally, a larger number of points is required for more valuable international or intercontinental tickets. Sometimes, additional incentives may be used to induce customers to reach certain point levels, such as by providing preferential seating and booking privileges. Similar loyalty systems are also used in environments for the retail sale of goods, with customers of a particular store being entitled to rewards in exchange for certain levels of business. Generally, however, such loyalty systems are limited in flexibility and are narrow in scope.

There is a general recognition in the industry of a need for more sophisticated loyalty-based systems capable of responding to long-term competitive threats such as retail overcapacity, mass advertising spending, consumer attrition issues, etc. For example, it is desirable for the system to be sufficiently flexible that rewards can be provided quickly, even in real time at the moment the desired point level is reached. Similarly, it is desirable for the system not to be reliant on a specific type of tender, such as a specific type of loyalty-program card, but instead to be capable of accepting any type of tender, whether it be a loyalty-program card, credit card, debit card, store-specific coupon, or other instrument. Furthermore, it is desirable to increase the convenience by which loyalty rewards are issued to customers as they qualify for such rewards.

BRIEF SUMMARY OF THE INVENTION

Embodiments of the invention thus provide methods and systems that integrate loyalty and stored-value programs to provide a more diverse array of capabilities both to merchants and to customers. In a first set of embodiments, a method is provided for operating an integrated stored-value and loyalty program within a financial infrastructure. An identifier and a packet of transaction information defining a transaction between a merchant and a customer are received at a loyalty host. Qualifying aspects of the transaction are identified from the packet of transaction information. A customer reward is determined from the identified qualifying aspects and a history of information defined by the identifier. Information defining the reward is transmitted to a stored-value host that records a value parameter that may be applied as value by the customer to another transaction.

In some of these embodiments, the packet of transaction information may also be transmitted to the financial infrastructure with a request for authorization of the transaction. In some instances, a notification of the customer reward is transmitted to a point-of-sale terminal at which the packet of transaction information was generated. The value parameter may be applied as value to the other transaction at a second merchant different from the merchant. In certain embodiments, the qualifying aspects of the transaction may include item-level information that identifies specific items or specific types of items that form part of the transaction. In different embodiments, identification of the qualifying aspects may be performed at the loyalty host or at a point-of-sale terminal where the packet of transaction information was generated.

In a second set of embodiments, a method is provided for operating a stored-value program. An identifier and a transaction amount are received at a stored-value host for a transaction between a merchant and a customer. A defined set of stored-value parameters is identified from the identifier. The set of stored-value parameters is translated into a value amount, at least a portion of which is applied to the transaction amount to define a modified transaction amount. The modified transaction amount is transmitted to a point-of-sale terminal at which the identifier and transaction amount were generated as an amount to be used in effecting the transaction.

In some embodiments, application of at least a portion of the value amount may further define a modified value amount, in which case the modified value amount may be translated into a modified set of stored-value parameters for use in updating a record of the stored-value parameters. The transaction amount may be transmitted to a financial infrastructure with a request for authorization of the transaction. In some instances, at least a portion of the set of stored-value parameters may be increased in response to an instruction from a loyalty host implementing a loyalty reward for the customer. In one embodiment, the identified set of stored-value parameters consists of a single stored-value parameter.

In a third set of embodiments, a method is provided for operating a loyalty program integrated with a financial infrastructure. An identifier and a packet of transaction information defining a transaction between a merchant and a customer are received at a loyalty host. A determination is made whether the customer and merchant are participants in the loyalty program. Specific items that form part of the transaction are identified from the packet of transaction information. A customer reward is determined from the identified specific items and a history of information defined by the identifier.

In some embodiments, the packet of transaction information may be transmitted to the financial infrastructure with a request for authorization of the transaction. In other embodiments, an authorization determination received from the financial infrastructure may be transmitted to the merchant. The identifier and packet of transaction information may be received from a point-of-sale terminal.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. Overview

Figure 1A:
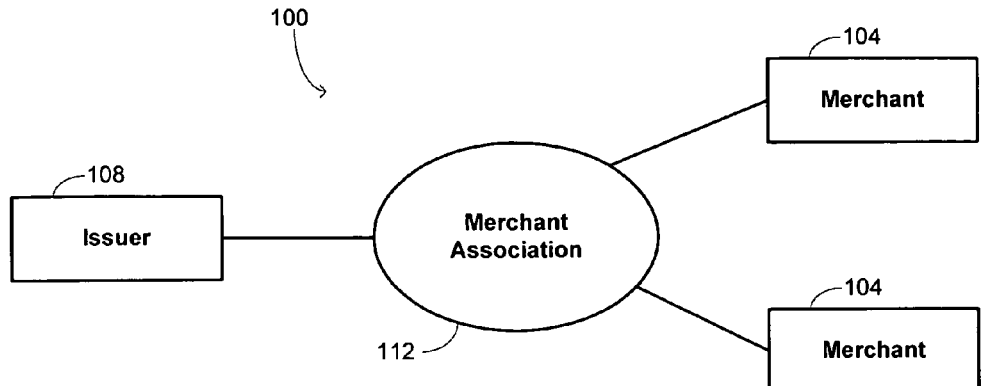
FIGS. 1A and 1B provide schematic illustrations of the organization of prior-art loyalty systems.

Various loyalty systems may involve a variety of different entities. A simple example of a traditional prior-art loyalty system is shown in FIG. 1A. In this illustration, the loyalty system 100 operates for a plurality of merchants 104 related by a merchant association 112. A single issuer 108 provides an instrument that may be used to identify individual customers and their participation within the loyalty system 100. For example, the merchant association 112 may simply be a commercial retail entity, such as "Store X" and merchants 104 may be retail outlets for that entity. The identification instrument issued by the issuer 108 may be a loyalty card that identifies the commercial entity. A customer may then present her card when she makes purchases at any retail outlet of Store X and accumulate points. Such points may be redeemed for merchandise from a catalog at some later date when certain point-total levels are reached.

Figure 1B:
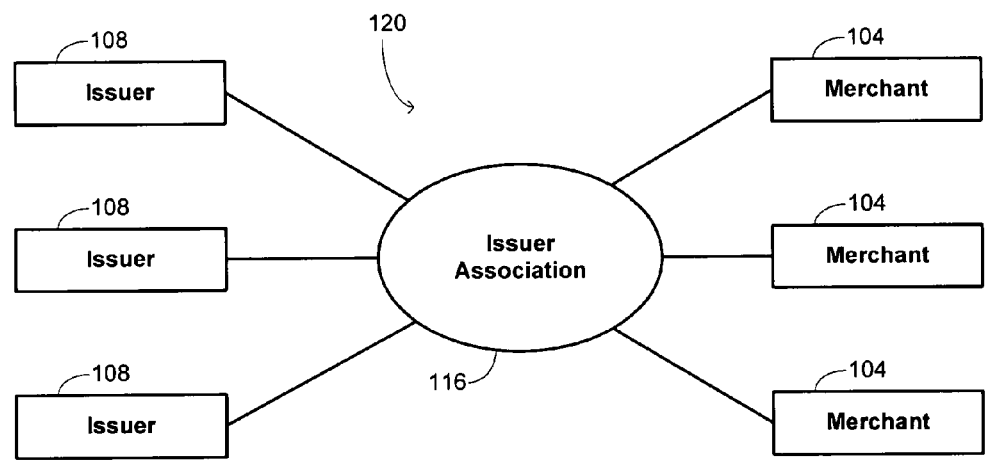

FIG. 1B illustrates a slightly more sophisticated loyalty system 120 that uses an issuer association 116 so that multiple issuers may participate in the system. A plurality of merchants 104 and a plurality of issuers 108 interact separately with the issuer association in administering the loyalty program. For example, the issuer association 116 may be a credit organization that interacts with a plurality of banks in providing credit to customers. A customer having an instrument, such as a credit card, issued by any of the banks and bearing the credit organization's logo may accumulate loyalty points whenever he uses the card. The card may be used to obtain credit for purchases at any of the participating merchants. Upon reaching certain point totals, the customer may redeem the points for goods or services from organizations having a suitable arrangement with the issuer association 116 and/or individual issuers 108.

The loyalty systems illustrated in FIGS. 1A and 1B remain constrained in their operation by the limited scope of relationships among specific merchants and issuers. One embodiment of the invention that provides significantly greater scope is shown schematically in FIG. 1C. The embodiment of FIG. 1C uses an aggregator 118 that acts as an intermediary between an issuer association 116 and a plurality of merchants 104. The aggregator 118 may also act as a direct intermediary between issuers 108 and merchants 104, in which case it functions in a manner similar to the issuer association 116 shown in FIG. 1B.

The increased versatility of loyalty programs that may be administered with this system 140 exploit the existence of multiple, and sometimes competing, issuer associations 116. For example, any instrument associated with an issuer association that also bears an identification of the aggregator 118 may be used to participate in a loyalty program. In some instances, the loyalty program will be for a single retail organization, but may in other instances span across multiple organizations. A variety of examples of loyalty programs that may be administered with the structure of FIG. 1C are discussed below.

Figure 1C:
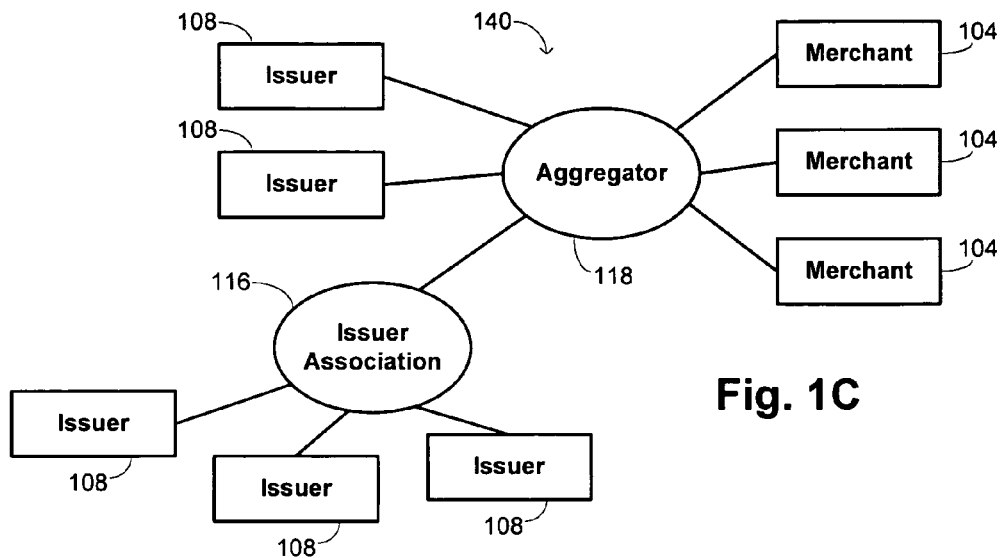
FIGS. 1C and 1D provide schematic illustrations of an organization of a loyalty system in accordance with embodiments of the invention.

The basic structure of FIG. 1C may be extended in further embodiments to encompass multiple aggregators 118. In the embodiment shown in FIG. 1D, the loyalty system 160 includes a plurality of aggregators 118, each of which interacts with at least one issuer association 116 and perhaps also directly with one or more issuers 108. A plurality of merchants 104 interact with the aggregators 118; each individual merchant within the system may interact with one or more of the aggregators. Accordingly, a particular merchant may permit any customer having an instrument identifying its associated aggregators to participate in a loyalty program. Further, that merchant may permit any customer having an instrument identifying any issuer associations 116 associated with those aggregators 118, or even any issuers 108 associated with those issuer associations 116 or aggregators 118, to participate. This arrangement thus provides an enhanced degree of versatility in the administration of loyalty programs.

Figure 1D:
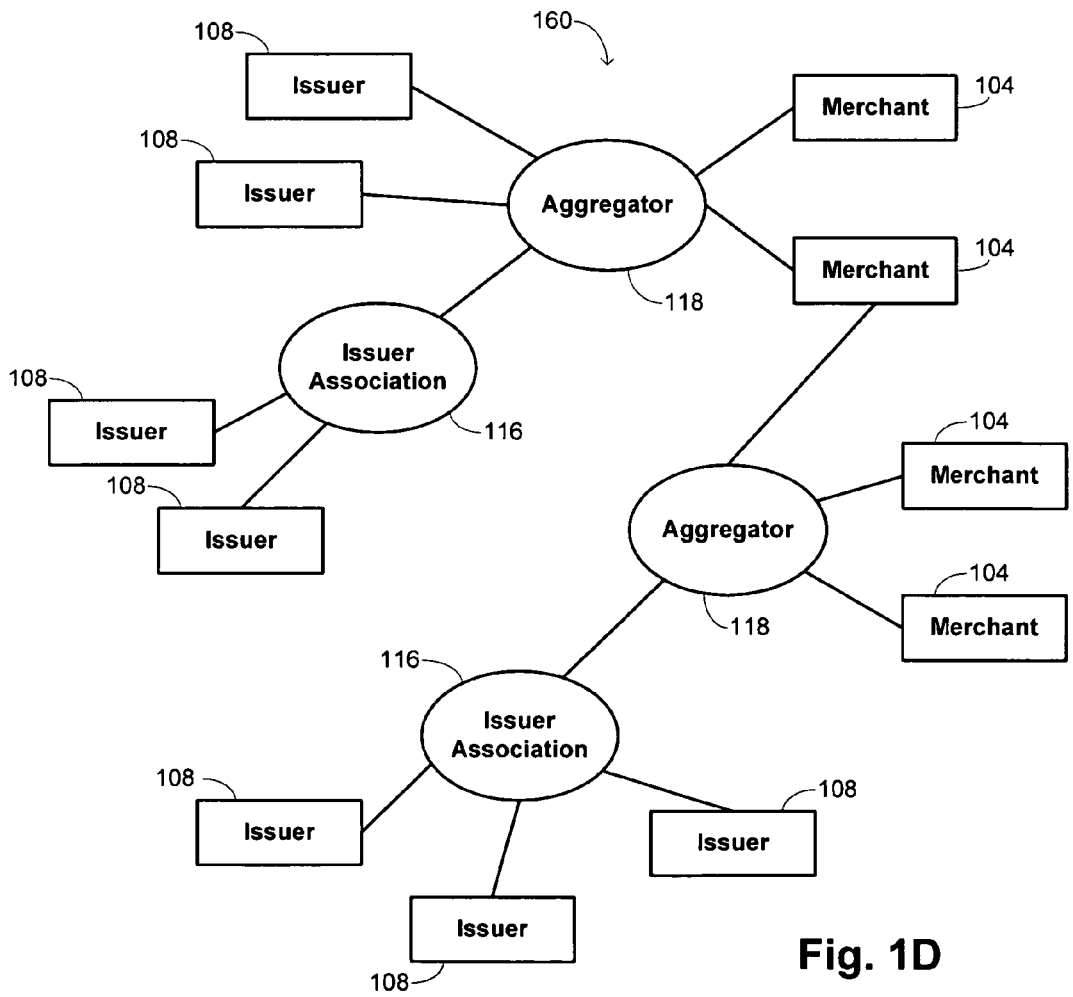

While FIGS. 1C and 1D show those merchants and issuers who participate in some aspect of a loyalty system, more generally there will also exist merchants and issuers who do not participate in the loyalty system. Such nonparticipating merchants and issuers may nevertheless wish to share in a financial infrastructure for processing transactions with the participating merchants and issuers. Such a financial infrastructure provides a general interconnection among merchants and issuers that permits credit, debit, check, stored-value, and other types of transactions to be executed. The infrastructure functions generally by permitting a merchant to transmit details of a transaction to a central authority, which then ensures that any necessary authorization from an issuer (or issuer association) is obtained so that the transaction may be approved.

In addition to integration with such a financial infrastructure, increased flexibility and convenience are provided to the loyalty system in embodiments of the invention through integration with a stored-value system. Such increased flexibility and convenience are manifested both in the administration of the system and in the types of rewards that may be provided to customers. Similar benefits are also enjoyed by the stored-value system as a result of its integration with the loyalty system, with the two systems combining synergistically as described below to provide capabilities beyond the mere combination of the systems.

2. Integration of Loyalty System with Stored-Value System

Figure 2A:
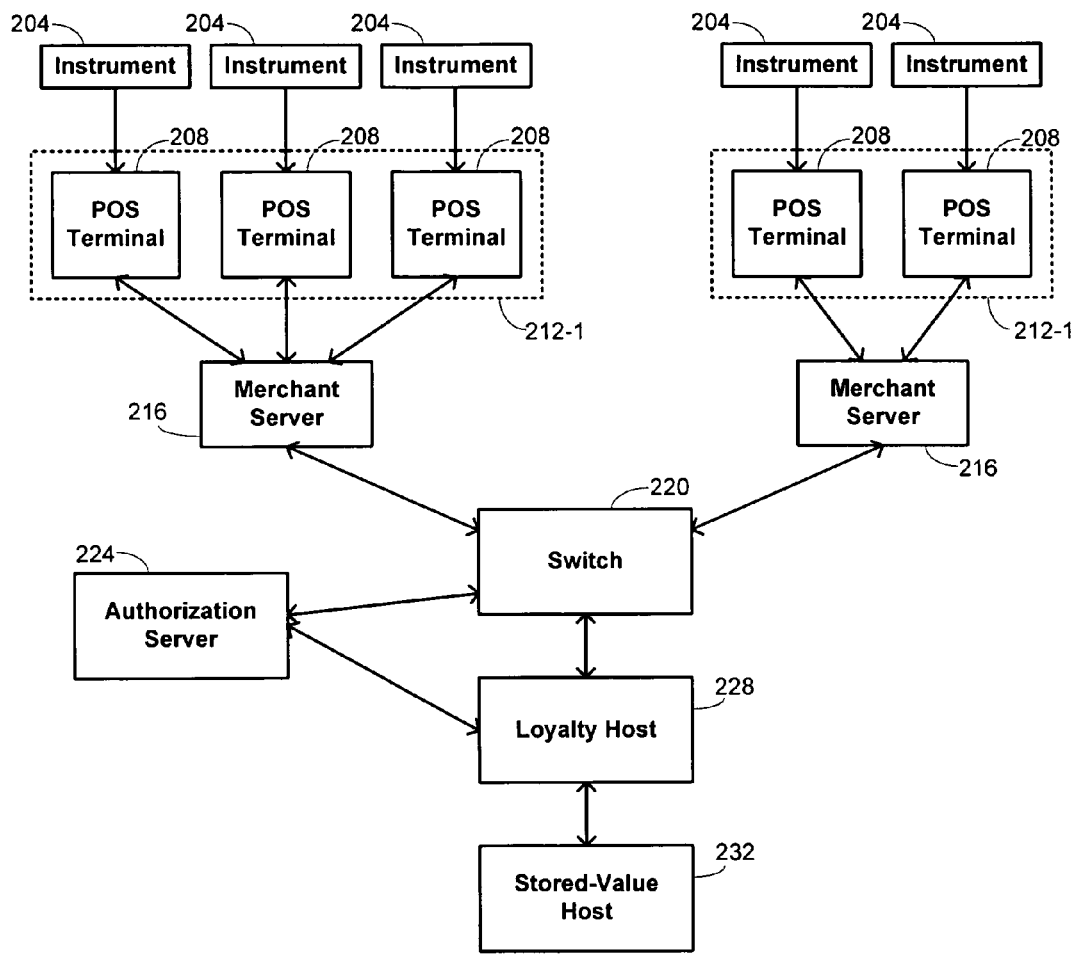
FIGS. 2A-2C provide schematic illustrations of how transaction information is routed in implementing both loyalty and stored-value programs according to embodiments of the invention.
Figure 2B:
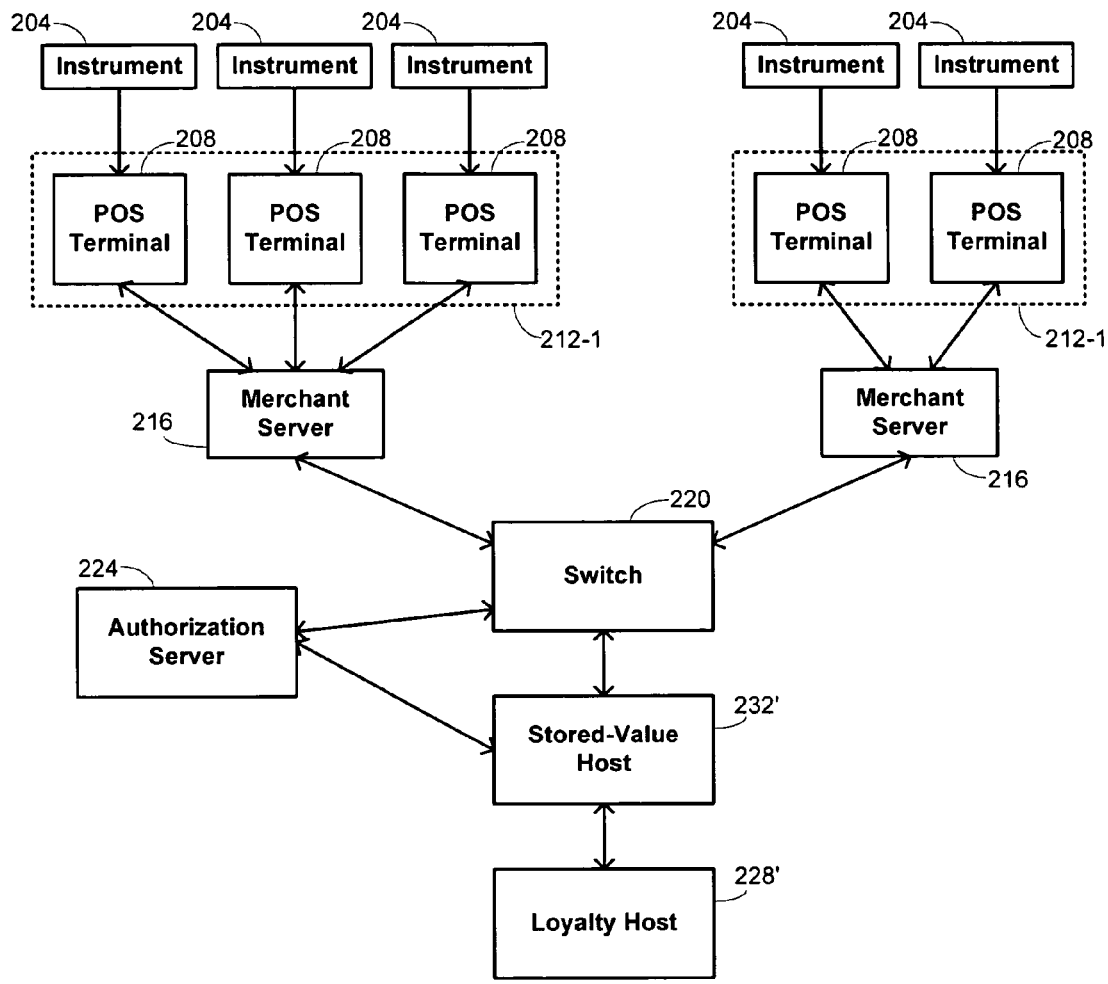
Figure 2C:
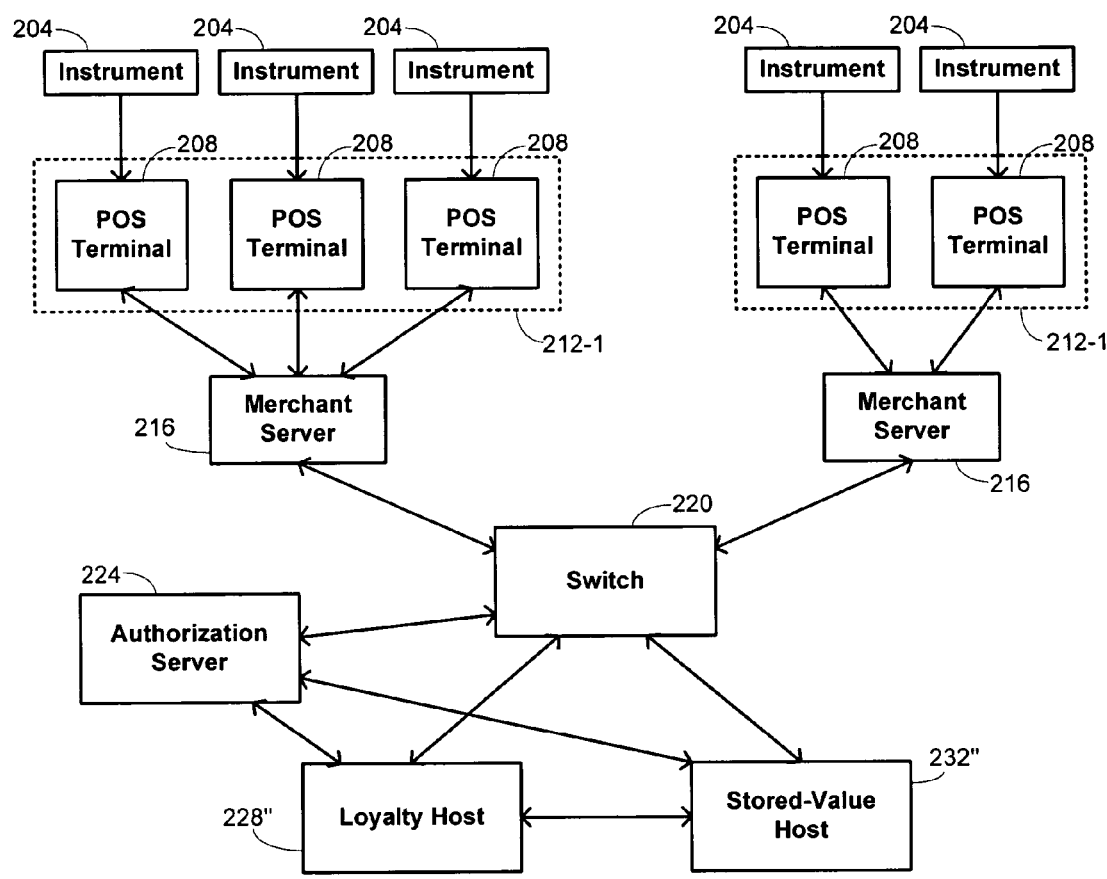

FIGS. 2A-2C provide schematic overviews of how a loyalty system structured in accordance with the embodiments of FIGS. 1C or 1D may be integrated with such a stored-value system and with a financial infrastructure. Additional details describing the integration with the financial infrastructure beyond what is discussed herein is provided in the parent application, which has been incorporated by reference. The structural arrangements shown in each of FIGS. 2A-2C are similar, although they differ in the manner in which communications are coordinated between hosts for the loyalty and stored-value systems. In particular, in each arrangement, a plurality of merchant servers 216 are provided in communication with a switching element 220 that coordinates transmission of communications within the integrated infrastructure. Each merchant server 216 is in communication with one or more point-of-sale terminals, which may be widely distributed geographically and which may be associated with a variety of different types of organizations, including retail outlets, services outlets, and the like. Each point-of-sale terminal 208 may be configured to accept one or more different types of instruments 204, such as a magnetic-stripe card 202 (including a credit, debit, or other card having magnetically encoded information), a chip card such as a smart card, a coupon, a check, a radio-frequency communication, and the like. Accordingly, customers may individually control the instrument used for participation in loyalty and stored-value programs and may use different aggregator instruments at different times if desired. Furthermore, the point-of-sale device 112 may include other components that facilitate execution of a transaction, such as payment-information-entry components, signature-capture components, keypads, keyboards, display screens, biometric-data-capture components, speakers, printers, processors, software, memory, communication devices, and the like. Examples of suitable point-of-sale devices that include multiple capabilities are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. pat. appl. Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

When a transaction is executed using a point-of-sale terminal 208, an electronic packet identifying the terms of the transaction, including an identification of a payment instrument, a stored-value-program identifier, and/or a loyalty-program identifier, is forwarded by the corresponding merchant server 216 to the switching element 220. The specific components of the electronic packet may vary in different circumstances since some transactions may be made without identifying a stored-value program and/or without identifying a loyalty program. Also, as described in additional detail below, the electronic packet may include item-level detail specifying each product that forms part of the transaction to be used in implementing certain loyalty programs that make use of such information. The manner in which the switching element 220 routes all or part of the electronic packet may depend on how it is physically connected with other parts of the integrated infrastructure. For example, in FIG. 2A, the switching element 220 includes a connection with an authorization server and with a loyalty host 228 that is configured to manage the loyalty program. The loyalty host 228 is in communication with a stored-value host 232 that is configured to manage the stored-value program.

The switching element initially makes a determination whether the merchant and customer who are parties to the transaction are registered with either or both of the loyalty system and stored-value system. Such a comparison is performed by comparing the identification of the parties included within the electronic packet with a database listing of registered participants. If either party is not registered, the switching element 220 only forwards the electronic packet to the authorization server 224 through communication networks comprised by the financial infrastructure. Such a routing may be appropriate, for example, where a transaction is initiated using a credit or debit card at a merchant that does not honor applicable stored-value or loyalty programs or by a customer who is not enrolled in such programs. Further details regarding how the information is then treated by the authorization server are provided in the parent application.

Irrespective of how it is implemented, the authorization server 224 may subsequently return an approval or denial code for the transaction depending a result of applying approval standards. The approval or denial code may then be routed back to the point-of-sale terminal 208 through the merchant server 216 be the switching element 220.

If the parties to the transaction are registered, indicating that the customer is participating in one or more forms of loyalty programs integrated with the financial infrastructure and/or is participating in a stored-value program integrated with the financial infrastructure, the switching element 220 forwards at least relevant portions of the electronic packet to the loyalty host 228. The loyalty host 228 stores administration criteria for the loyalty programs and includes protocols for further forwarding relevant portions of the electronic packet to the stored-value host 232 as needed. The administration criteria for the loyalty programs may be applied in accordance with a variety of different schemes, some of which are described below, and such administration may including routing data back to a point-of-sale terminal 208 through the switching element 220 and a merchant server 216. The stored-value host 232 stores administration criteria for the stored-value programs and may route information back to a point-of-sale terminal 208 through the loyalty host 228, switching element 220, and merchant server 216.

FIG. 2B illustrates an alternative embodiment in which the logical positions of the loyalty host 228 and stored-value host 232, now denoted with primes as loyalty host 228' and stored-value host 232', are interchanged. The operation of this architectural arrangement is similar to that described in connection with FIG. 2A, but with this configuration, the electronic packet is routed first to the stored-value host 232' and then subsequently to the loyalty host 228'. The stored-value host 232' then stores administration criteria for the stored-value programs and includes protocols for further forwarding relevant portions of the electronic packet to the loyalty host 228', which includes a store of administration criteria for the loyalty programs. Data routed back to a point-of-sale terminal 208 as part of implementing the loyalty and/or stored-value programs may be routed through the switching element 220 and a merchant server 216, in addition to through the stored-value host 232' in the case of the loyalty programs.

FIG. 2C illustrates a further embodiment in which data routing to the loyalty host 228" and stored-value host 232", denoted with double primes, may be performed in parallel rather than serially. In particular, in this instance, communications links exist between the switching element 220 and loyalty host 228" that do not require routing through the stored-value host 232" and similarly between the switching element 220 and stored-value host 232" that do not require routing through the loyalty host 228". In such an embodiment, each of the stored-value and loyalty hosts 228" and 232" stores respective sets of administration criteria and may route data back through the switching element 220 and a merchant server 216 to a point-of-sale terminal 208 as appropriate in some embodiments.

In the architectures illustrated with FIGS. 2B and 2C, the switching element is additionally shown equipped to forward the electronic packet to the authorization authority 224, as was mentioned in connection with FIG. 2A. In some alternative embodiments, this function may alternatively be performed by the loyalty host or stored-value host over corresponding communication links. Such a capacity may be used, for example, in embodiments where application of the loyalty and/or stored-value programs is to be implemented only if the transaction is properly authorized and executed.

The structure of FIGS. 2A-2C is also intended to illustrate that information regarding the loyalty and stored-value programs may be obtained from multiple merchants. In some embodiments, these multiple merchants may define a coalition that acts in concert in implementing loyalty and/or stored-value programs. For example, such a coalition might include at least one merchant from different market segments to enhance an overall customer experience and provide greater versatility in the loyalty programs. This greater versatility may be reflected, for example, by offering rewards in one market segment that result from customer activity in a different market segment. This cooperation among merchants thus benefits customers by significantly expanding the scope of the potential loyalty rewards and also acts to the benefit of merchants by inducing customers to participate in particular ways in other market segments.

3. Stored-Value and Loyalty Programs

In embodiments of the invention, stored-value programs may be implemented by using one or more stored-value parameters. These stored-value parameters may, for example, hold information related directly to aspects of a purchasing history by customers, with the actual currency value being correlated to the stored-value parameters by a particular algorithm. Such an arrangement provides considerably greater flexibility in the way in which value indicators may be stored when compared with simply storing cash-value amounts, and permits a more flexible integration with the loyalty programs. In some instances, maintaining stored-value parameters in lieu of cash-value amounts permits the implementation of loyalty programs that would not possible with an integration with a cash-value stored-value program.

The specific nature of the stored-value parameters may vary in different instances, and may be used to accumulate such information as the number of times purchases have been made at a particular location, the number of times particular products or classes of products have been purchased, the number of times certain value constraints have been met by individual purchases, and the like. These types of information may be easily aggregated by loyalty activity and subsequently be converted to cash value when the stored-value program is implemented. In some cases, a reverse conversion may be used when value is added to a stored-value program with cash or equivalent value. The use of a surrogate conveniently allows the implementation of nonlinear translations between the values that are stored and their corresponding cash values. For instance, points could be distributed so that 1.0 point is assigned for each dollar of value up to $25, 1.2 points are assigned for each dollar of value between $26 and $50, 1.5 points are assigned for each dollar of value between $51 and $100, 1.8 points are assigned for each dollar of value between $101 and $500, etc. Similar nonlinear translations may be used is redeeming the value, and different translation algorithms may be used for purchasing and redeeming value to accommodate specific types of arrangements. Furthermore, the reverse translation capabilities may be used in some instances to accelerate qualifications for certain rewards through the stored-value mechanisms. Some examples of this type of interplay between the stored-value and loyalty aspects of the integrated arrangement are discussed with a number of examples in greater detail below. Still more complex algorithms may be used in the value translations by making use of more than one type of value. For example, determination of a cash amount may depend on multiple parameters that store different types of information.

Figure 3:
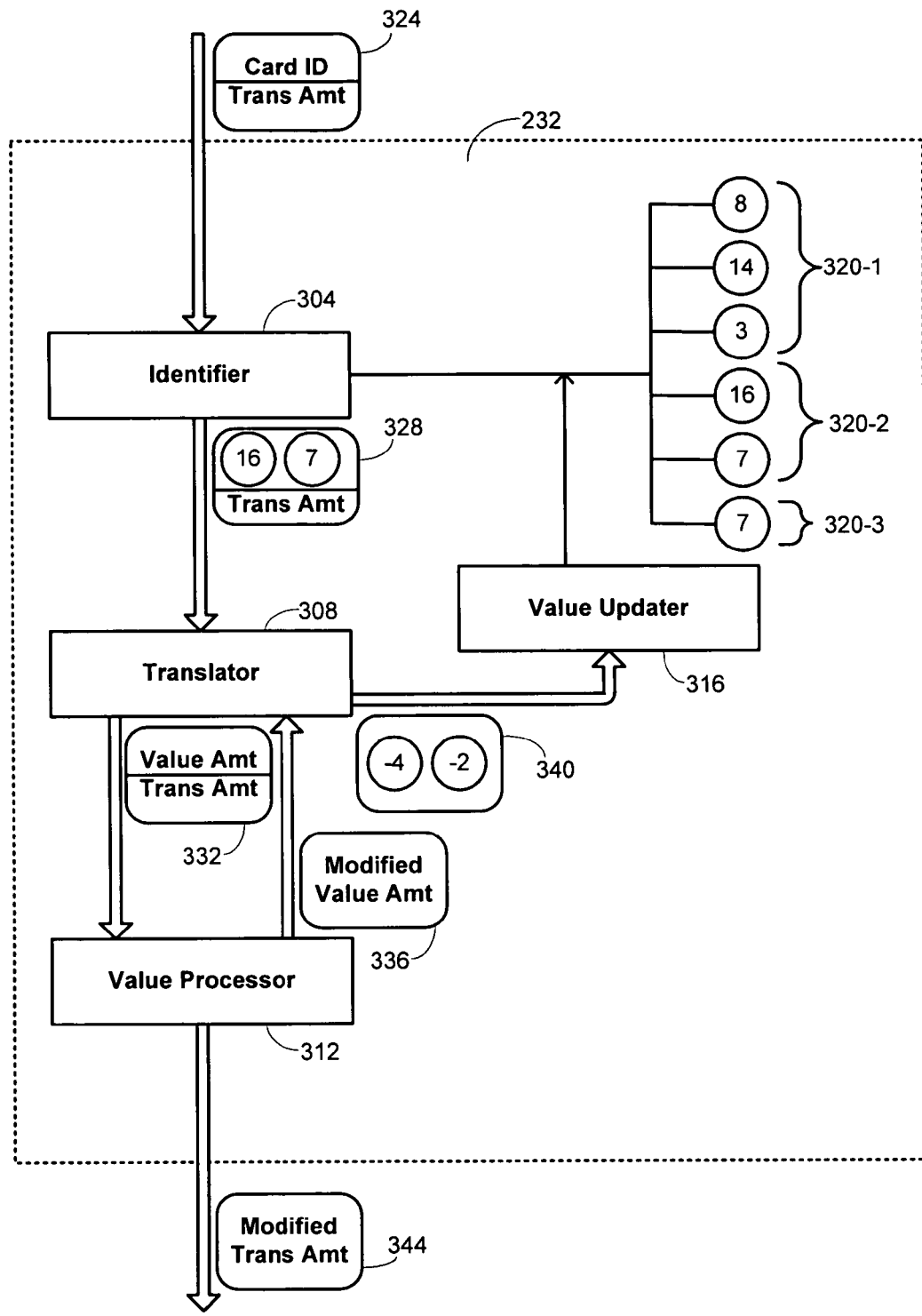
FIG. 3 provides a schematic illustration of how information is processed by a stored-value host in implementing an embodiment of the invention.
Figure 4:
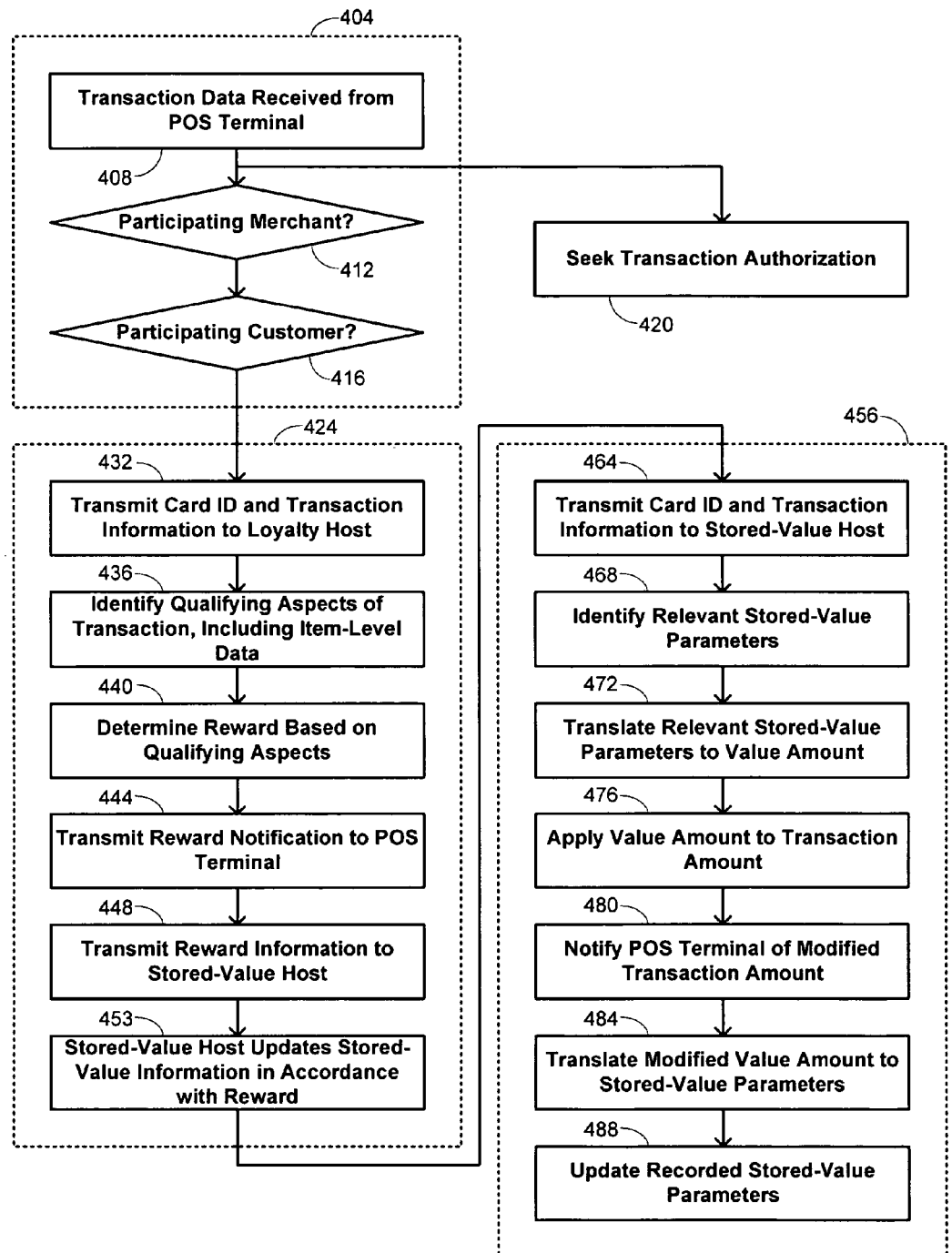
FIG. 4 provides a flow diagram illustrating the operation of a loyalty host and a stored-value host in implementing certain embodiments of the invention.

FIG. 3 provides an illustration of a logical structure that may be used by the stored-value host 232 to store and perform translations in order to maintain value records and to effect use of the corresponding value. This logical structure includes a number of modules, including an identifier 304, a translator 308, a value updater 316, and a value processor 312, each of which may be implemented as software in an appropriate hardware computational device. When a request is received for use of some of the stored value for a particular customer, an electronic packet 324 may be received that includes a card identifier and a transaction amount. These values may have been generated, for example, by the point-of-sale terminal 208 as part of a transaction and routed through any of the architectures shown in FIGS. 2A-2C to arrive at the stored-value host 232. The card identifier provides a unique identification of one or more stored-value accounts; while it is described herein for convenience as a card identifier used to identify a stored-value card presented during a transaction, it will be appreciated that the identifier may apply more generally to identify the stored-value accounts and does not require the use of a card.

The different accounts that may be maintained are illustrated schematically in the figure with circles that enclose certain point values. Each card identification may identify one or more of the accounts, as indicated by sets 320. The card identification is thus used by the identifier module 304 to identify which stored-value accounts are to be considered in the value translation. In the example, the accounts identified by set 320-2 are used so that an intermediate electronic packet 328 may be generated in which the card identification is substituted with the point values for those accounts. This intermediate electronic packet 328 is used by the translator module 308 to convert the point values into a cash value amount, as indicated in electronic packet 332. Such a translation is performed in accordance with the specified algorithms and may differ for a number of different reasons. For example, the stored-value host 232 may be intended to handle a number of different stored-value programs, perhaps for a variety of different merchants, merchant associations, and/or issuer associations, and each of those programs may treat the translations in a different fashion.

The value processor module 312 determines how the stored value is to be applied to the transaction amount, producing electronic packets that define a modified transaction amount 344 and a modified value amount 336 depending on that application. In a relatively simple embodiment, this may be preformed simply by comparing the size of the value amount with the transaction amount in electronic packet 332. If the value amount is greater than the transaction amount, the modified transaction amount 344 may be reduced to zero and the modified value amount 336 set equal to the difference between the original value amount and the original transaction amount. If the transaction amount is instead greater than the value amount, the modified transaction amount 344 may be set equal to the difference between the original transaction amount and the original value amount while the modified value amount is set to zero. In other embodiments, other types of manipulations may be performed in assigning the modified value and transaction amounts 344 and 336, perhaps taking into account standing instructions regarding such manipulations provided by the customer or specific instructions that may be provided by the customer at the point of sale. Such alternative manipulations may be designed to deplete certain types of value parameters preferentially over others.

The modified value amount 336 is returned to the translator module 308 for translation back into the stored-value parameters to update those values in accordance with execution of the transaction. An electronic packet 340 that defines how the value parameters are to changes is therefore transmitted to the value updater module 316, which changes the value parameters as indicated.

Figure 5A:
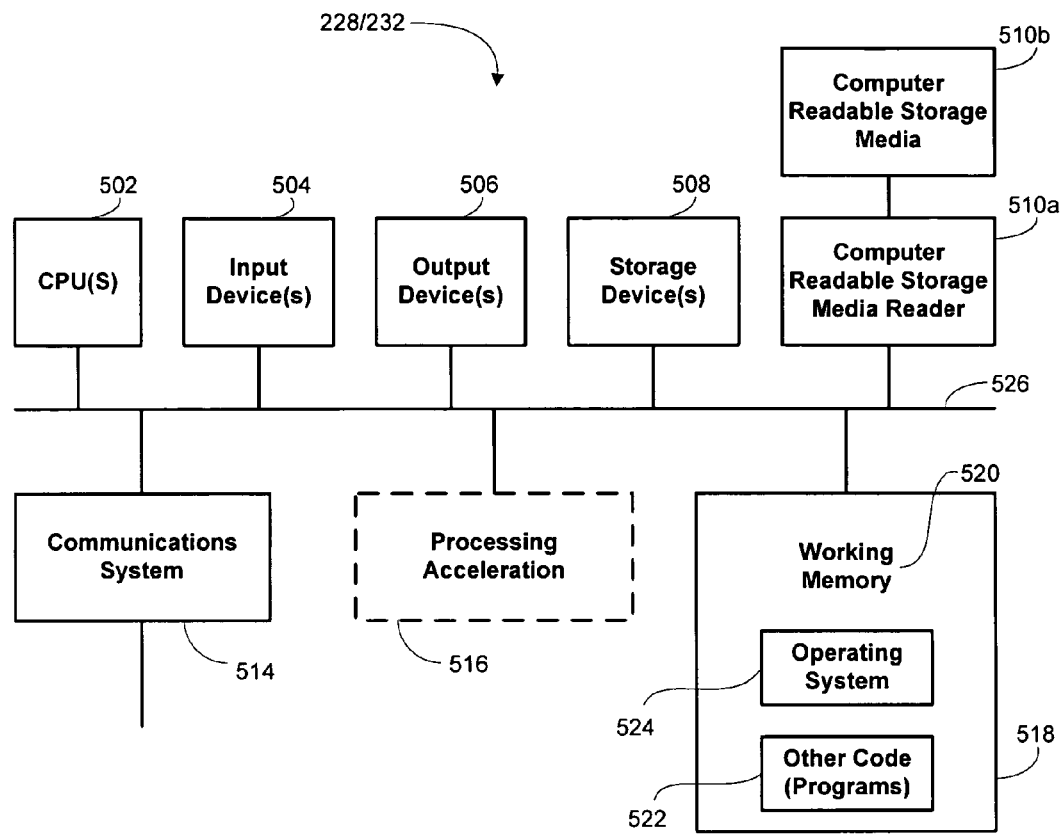
FIG. 5A provides a schematic illustration of a computer system that may be configured to perform functions of the loyalty host and/or stored-value host in accordance with embodiments of the invention.

The coordinated operation of the switching element 220, loyalty host 228, and/or stored-value host 232 with respect to a transaction is illustrated with the flow diagram of FIG. 5 for one embodiment. Those functions performed by the switching element 220 are denoted generally by block 404, those performed by the loyalty host 228 are denoted generally by block 424, and those performed by the stored-value host 232 are denoted generally by block 456. The progression through the flow diagram is shown for an embodiment that uses the architecture described in connection with FIG. 2A, with loyalty-host functions being performed in block 424 after switching-element functions in block 404 and before stored-value-host functions in block 456. In alternative architectures, the progression through the flow diagram may differ. For example, with the architecture described in connection with FIG. 2B, the flow may proceed from block 404 to block 456 and then to block 424; alternatively, with the architecture described in connection with FIG. 2C, the flow may proceed in parallel from block 404 to blocks 424 and 456. Moreover, there is no requirement that the functions represented by the individual blocks be performed in the order indicated. In some alternative embodiments, the functions may be performed in a different order, some functions may be omitted, and some additional functions may be added.

At block 408, transaction data are received from the point-of-sale terminal 208 as an electronic packet by the switching element 220. The item-level transaction information that may be included in that electronic packet may be obtained at the point-of-sale terminal by reading bar-code information printed directly on an item or an affixed label. The identification by the point-of-sale device 208 is generally sufficient to identify both the price of each item as well as to provide a classification of each item. In embodiments that use bar codes, for example, classification may be deduced from the bar code in accordance with standardized classification systems, including, for example, the Universal Product Code ("UPC") system, the European Article Number ("EAN") system, the Global Trade Item Number ("GTIN") system, the Serialized Shipping Container Code ("SSCC") system, the Global Location Number ("GLN") system, the Global Returnable Asset Identifier ("GRAI") system, the Global Individual Asset Identifier ("GIAI") system, and the Global Service Relation Number ("GSRN") system, among others. Many of these systems are currently administered by the Uniform Code Council, Inc. ("UCC") and EAN International. While the emphasis of the these organizations is currently on bar-code technologies, including Reduced Space Symbology ("RSS") and Composite Symbology ("CS"), they acknowledge that the systems may alternatively be implemented using other technologies, such as with radio-frequency tags. Embodiments of the invention are not restricted to any particular classification technology and are intended to encompass all such classification systems.

The transaction information may be used as indicated at block 420 to seek authorization for the transaction in the manner described in further detail in the parent application; details regarding the return of a denial or approval code for the transaction are discussed at length in that application and have been incorporated by reference. At block 412, the electronic packet is analyzed to identify the merchant at which the transaction originated and to determine whether that merchant participates in any of the loyalty and/or stored-value programs administered by the loyalty and/or stored-value hosts 228 and 232. Similarly, the electronic packet is analyzed at block 416 to determine whether the customer who is a party to the transaction participates in the loyalty and/or stored-value programs. If the merchant or customer does not participate, the transaction-authorization process may proceed but neither the loyalty not stored-value programs is implemented.

If loyalty functions are to be invoked, the card identification and transaction information are transmitted to the loyalty host 228 at block 428. Aspects of the transaction that qualify for loyalty credit are identified from the transaction data, including identification of item-level data that may define qualifying aspects of the transaction, at block 436. These qualifying aspects are used to determine whether a reward should be issued at block 440. Usually such a determination is made on a combination of aspects of the current transaction with recorded past behavior, although in some instances a single transaction may qualify for a reward. If there has been no qualification for a reward, the qualifying aspects of the transaction may be accumulated with the records of prior transactions so that a similar determination whether a reward has been earned may be made with data from a subsequent transaction.

If a reward has been earned, there are multiple ways in which the reward may be provided to the customer in different embodiments. For instance, in one embodiment, the reward is provided as an immediate reward, such as with an immediate reduction in the cost of the current transaction to the customer. Such an immediate reward may be provided as indicated at block 444 by transmitting an award notification back to the point-of-sale terminal 208 for application at block 444. In other embodiments, the transmittal at block 444 may result in the printing of a certificate or notification of the award by the point-of-sale terminal 208 rather than resulting in an immediate application of the reward. Such embodiments may be suitable when the reward applies to a different merchant or class of merchants who participate in a coalition-based loyalty program.

In still other embodiments, the notification provided at block 444 may simply indicate to the customer that a reward has been made and automatically credited to the stored-value program that the customer participates in. In these cases, the reward may be effected by transmitting award information directly to the stored-value host 232 as indicated at block 448, with the stored-value host 232 then updating the stored-value information at block 453 in accordance with the reward information. For instance, a customer might make purchases at merchant X, a clothing retailer, that qualifies her for a reward that is equal to 100 points in a stored-value account that is restricted to redemption at merchant Y, a hardware retailer. Accordingly, the customer is notified of the reward through the point-of-sale terminal 208 at the time of the purchase at merchant X, and the stored-value host 232 automatically credits the stored-value account with the 100 points.

If the stored-value functions are to be invoked, the card identification and transaction information are transmitted to the stored-value host 232 at block 464. The transaction information includes at least the total transaction amount and may also include subamounts that correspond to particular types of items that form part of the transaction. Relevant stored-value parameters are identified at block 468 as described above by identifying which stored-value accounts correspond to the received card identification and perhaps also correspond to the accounts that are limited to use at the particular merchant or for a particular product type. The stored-value parameters are translated to a value amount at block 472, such as by using the translator module 308 described in connection with FIG. 3. At block 476, the value amount is applied to the transaction to determine a modified transaction amount and a modified value amount. These values are usually reduced by the same amount from the original transaction and value amounts, although there may be instances in which the reductions differ. The point-of-sale terminal is notified of the modified transaction amount at block 480 so that that amount may be substituted for the original transaction amount in executing the transaction. In addition, the modified value amount is translated to the stored-value parameters at block 484 so that the recorded stored-value parameters may be updated at block 488.

In the foregoing description, identification of the item-level data in administering the loyalty programs was described as being performed at the loyalty host 228. In other embodiments, however, such item-level information may alternatively be processed at a different point in the architecture. In one such embodiment, the item-level information is processed at the point-of-sale terminal 208 where the transaction is initiated. In this embodiment each point-of-sale terminal 208 includes a copy of item-level qualifications for the loyalty programs so that those parts of the transaction that qualify may be identified at the outset. Rather than transmit specific item-level information as part of the electronic packet to the switching element 220, the electronic packet may instead simply identify that certain qualifications for certain loyalty programs have been met. Such an embodiment simplifies the operation of the loyalty host 228, but requires that data specifying administration of the loyalty programs be maintained on multiple point-of-sale devices 208. In another embodiment, these two considerations may be compromised by maintaining the item-level loyalty-program information on the merchant servers 216 and performing the identification of met qualifications at those points in the architecture.

Each of the loyalty host 228 and stored-value host 232 may be configured in a variety of different ways to effect the functions described. In one embodiment, a computer system is used for each, one example of which is shown schematically in FIG. 5A. This figure broadly illustrates how individual system elements for the loyalty host 228 or stored-value host 232 may be implemented in a separated or more integrated manner. The loyalty host 216 or stored-value host 232 is shown comprised of hardware elements that are electrically coupled via bus 508, including a processor 502, one or more input devices 504, one or more output devices 508, one or more storage devices 508, a computer-readable storage media reader 510a, a communications system 514, a processing acceleration unit 516 such as a DSP or special-purpose processor, and a memory 518. The computer-readable storage media reader 510a is further connected to a computer-readable storage medium 510b, the combination comprehensively representing remote, local, fixed, and/or removable storage devices plus storage media for temporarily and/or more permanently containing computer-readable information.

Information regarding merchants, issuers, individual customers and details specifying the administration of the loyalty and/or stored-value programs is generally stored on the storage devices 508. The communications system 514 is configured to effect communications as needed by receiving the electronic packet from the switching element 220 and to provide return communications back through the infrastructure. In addition to providing such infrastructure communications links internal to the system, the communications system 514 may also provide a connection to other networks such as the Internet and may comprise a wired, wireless, modem, and/or other type of interfacing connection. Such additional connections may be useful for support functions that may be assisted by the loyalty host 228 and/or stored-value host 232 described briefly below and in greater detail in the parent application.

The loyalty host 228 or stored-value host 232 also comprises software elements, shown as being currently located within working memory 520, including an operating system 524 and other code 522, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Figure 5B:
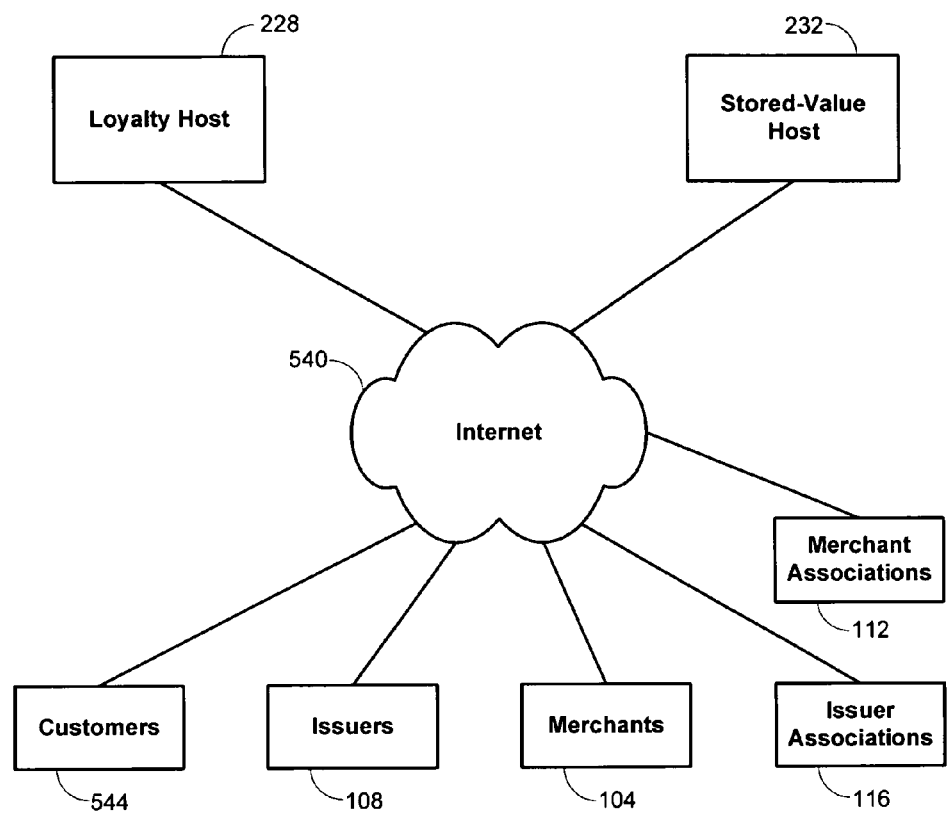
FIG. 5B provides a schematic illustration using a public-network connection to access the loyalty host and/or stored-value host in implementing program-management functions.

FIG. 5B provides a schematic illustration of one embodiment in which the loyalty host 228 and the stored-value host 232 are connected with the Internet 540 to provide support services to merchants 104, issuers 108, merchant associations 112, issuer associations 116, and/or customers 544. In additional to managing transactions for loyalty and/or stored-value credit, the respective hosts 228 and 232 may be configured to assist in supplementary service functions able to exploit the fact that the hosts 228 and 232 are equipped to maintain database information for the participating merchants 104, issuers 108, merchant associations 112, issuer associations 116, and/or customers 544. Accommodation of such support services over an Internet connection is in addition to the use of infrastructure connections described with respect to FIGS. 2A-2C and intended for services that are not as time critical as the loyalty, stored-value, and authorization decisions needed at the time of a transaction.

Examples of support services that may be configured in this way include card-creation services, customer-care services, and settlement services, in addition to other support services. Such services may be provided as functions comprised by the hosts 228 and 232 or may be provided as functions operating separately but with access to the hosts. Elements for providing the support services thus usually include a communication with the Internet 540 so that their functions may be accessed as necessary or desirable by merchants 104, issuers 108, merchant associations 112, issuer associations 116, and/or customers 544. Further description of support functions that may be supported is provided in the parent application, which has been incorporated by reference.

Figures 6A, 6B:
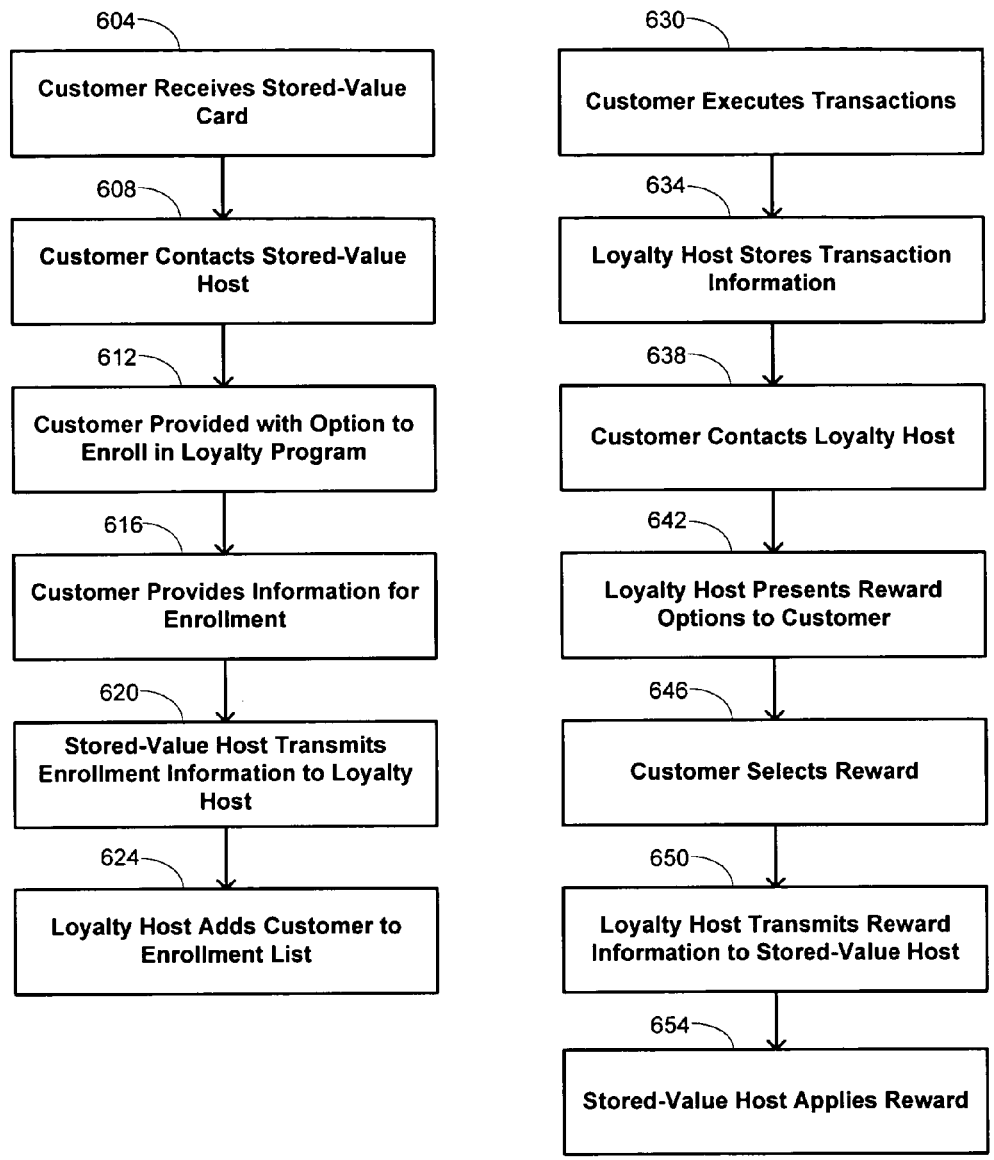
FIGS. 6A and 6B provide flow diagrams illustrating some exemplary program-management functions that may be implemented with the loyalty host and/or stored-value host.

FIGS. 6A and 6B use flow diagrams to provide examples of program-management functions that may be implemented with the integrated loyalty and stored-value systems. FIG. 6A illustrates how a recipient of a stored-value card may enroll in a corresponding loyalty program, such as when a customer receives a stored-value card as indicated at block 604. Often, stored-value cards are provided to recipients in the form of gift cards, which are preloaded with a certain value. In cases where the integration with a loyalty program is promoted, the stored-value card may have contact information printed on the card to encourage the recipient to enroll in that loyalty program. Thus, at block 608, the customer may contact the stored-value host, usually by using the Internet connection shown in FIG. 5B, but perhaps alternatively with a telephone interface, through a customer-service representative, or in some other fashion. In response to an option provided to the customer at block 612 to enroll in the loyalty program, the customer provides suitable enrollment information at block 616. This enrollment information is transmitted by the stored-value host to the loyalty host at block 620 so that the loyalty host may add the customer to its enrollment list at block 624. Thereafter, the customer may participate in the loyalty-program aspects provided by the system in addition to participating in the stored-value aspects.

In some instances, the experience of the customer may be enhanced by providing the customer with the ability to choose a reward from among a number of options, rather than simply providing a default award based on transaction activity. One method of providing such options is illustrated in FIG. 6B. In response to execution of various transactions at block 630, the loyalty host stores and accumulates transaction information at block 634 to monitor the customer's progress towards a reward. In some cases, different rewards may be provided at different levels, with the customer being required to forego a lower-level reward to accumulate more transactions to qualify for the higher-level reward. When the customer contacts the loyalty host at block 638, such as over the Internet connection shown in FIG. 5B or through another mechanism, the loyalty host presents a number of reward options to the customer at block 642 from which the customer may make a selection at block 646. In response to the customer's selection, the loyalty host transmits reward information to the stored-value host at block 650 so that the stored-value host may apply the reward at block 654.

4. Examples

The systems described above are suitable for accommodating a large variety of different types of loyalty programs, and for integrating those programs with stored-value programs. Individual programs may be specific to an individual store or organization or may span across multiple otherwise unrelated organizations as part of a more comprehensive coalition-based loyalty system. In one aspect, individual customers may participate in multiple loyalty programs that are managed as independent programs by the aggregator 118. Points maintained for the different programs are identified and distinguished by different point types. In this way, the customer may be able to use a single instrument identified with the aggregator's logo for participation in all its loyalty programs.

For each of the loyalty programs, rewards may be accumulated in at least three ways. First, rewards may be based on recency criteria, in which a reward is triggered either by completing a transaction within a specified time interval or by completing a specified number of transactions within a given time interval. Second, rewards may be based on frequency, in which a reward is triggered by completing a specified number of transactions. Third, rewards may be monetarily based so that a reward is triggered when a specified total transaction amount is reached. Such triggers may be specified for individual transactions or may be specified for accumulated transaction amounts over multiple transactions.

In addition, reward triggers may be conditional. Examples of conditional triggers include a requirement that points be accumulated only for transaction above a certain amount, and perhaps that points be accumulated more generally at different rates for transactions of different sizes. Other conditional triggers may be associated with time constraints so that points may only be accumulated only after a specified date, only before a specified date, only on certain days of the week, only during certain holiday periods, etc. Accumulation of points may also be conditionally restricted to certain tender types and to transactions where no reward is applied.

Accumulation of rewards is generally tracked in terms of points, which may be correlated with aspects of a transaction, and may be set to expire after a certain time period or at a predetermined time. Thus, for a recency loyalty system, points will generally be set to expire within the time period required for completion of the transactions. For a frequency loyalty system, points will usually be integers corresponding to the number of transactions completed. For a monetary loyalty system, points will be correlated with the dollar amount of the transaction, perhaps nonlinearly if customers are to be credited differently based on the size of individual transactions. The correlation rates may differ for different issuers, even within the same loyalty program, requiring use of the settlement functions among issuers and/or merchants. Points may generally be structured to expire periodically or after a specified period of inactivity to prevent excess accumulation by individual customers. Furthermore, point totals for individuals may be conditioned to reset when awards are given, to reset on a cyclical basis (e.g., monthly or annually), to continue to accumulate (rewards given for different levels reached), or to be permanently eliminated upon issuance of a reward (such as for a one-time reward).

In certain embodiments, points may be accumulated collectively by multiple customers. For example, each member of a family may have a separate card that identifies them individually, but points are accumulated into an account for the family as a whole. In other embodiments, points may be transferred among customers.

The manner in which such loyalty programs function may be illustrated with specific examples. First, consider a coalition-based loyalty program in which points are given for every dollar spent at any of a plurality of stores having diverse retail practices, such as a clothing chain, a hardware chain, and a restaurant chain. A customer who uses a card bearing a logo for the aggregator that manages this program accumulates points at any of the stores and may exchange the accumulated points for goods at any of the stores. For example, the customer may make a series of purchases at the hardware chain over a period of time and may subsequently redeem the points for dinner at a restaurant that forms part of the restaurant chain. This is an example of a purely monetary loyalty program that operates by the individual chains determining how to allocate point values among themselves to accommodate their respective benefits of participating in the program. This is also an example where different money-point correlation rates may be appropriate to account for differences in retail practices among the merchants.

As another example, consider a loyalty program in which a pizza chain and a video-rental chain cooperate. They advertise collectively that anyone who buys three pizzas at the pizza chain may receive a free video rental at the video-rental chain and anyone who rents fifteen videos at the video-rental chain is entitled to a free pizza at the pizza chain. Customers having cards bearing the aggregator logo have their purchases of pizzas and rentals of videos recorded so that the reward may be issued when the criteria have been fulfilled. Such rewards may be given automatically at the point of sale when the customer uses his card. This is an example of a frequency-based reward system that uses the aggregator to integrate separate organizations into the plan in a cooperative way.

As a further example, consider a loyalty program in which a movie-theater chain, a bookstore chain, and a music-store chain that are otherwise independent from one another cooperate. They offer a program in which, in any monthly period, a $25.00 purchase at each of two of the chains entitles the customer to a $5.00 rebate towards a purchase at the third chain. The purchases of customers having cards bearing the aggregator logo are recorded whenever they visit any of the three chains and issue the appropriate reward when the conditions are met. This example combines aspects of recency-based and monetary-based loyalty systems that use the aggregator to permit separate organizations to cooperate to their mutual benefit.

In each of these examples, the customer may be provided with a significantly more diverse array of options when the loyalty program is coupled with the stored-value program. In particular, in some embodiments the customer may be permitted to exercise greater control over how accumulating points are used by storing the loyalty points as value parameters used by the stored-value system. In such embodiments, the points may be allowed to accumulate by the customer to trigger a loyalty reward, or may be used according to the value translation used by the stored-value host. Loyalty rewards may effectively be accelerated through payment by the customer, i.e. by adding stored value that translates into the desired types of value parameters.

In other instances, the reloading of value in the stored-value portion of the program may itself generate loyalty points towards a reward. For instance, a reward may be provided, say in the form of a free pizza purchase, every time five value reloads that exceed $50 are made. The rewards may vary, such as to encourage reloading larger value amounts.

Still other arrangements are enabled by embodiments of the invention, as will be evident to those of skill in the art.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for operating an integrated stored-value and loyalty program within a financial infrastructure, the method comprising:

receiving, at a loyalty host computer from a first point-of-sale terminal, an identifier and a packet of transaction information defining a first transaction between a first merchant and a customer;

identifying, with the loyalty host computer, qualifying aspects of the first transaction from the packet of transaction information;

determining, with the loyalty host computer, a customer reward from the identified qualifying aspects and a history of information defined by the identifier;

transmitting information defining the reward from the loyalty host computer to a stored-value host computer different from the loyalty host computer;

determining a set of stored-value parameters with the stored-value host computer from the information defining the reward;

storing the set of stored-value parameters as a record at the stored-value host computer;

receiving, at the stored-value host computer from a second point-of-sale terminal, the identifier and a transaction amount for a second transaction between a second merchant and the customer, wherein the second transaction is different from the first transaction and is initiated at a point in time later than the first transaction is initiated;

identifying, with the stored-value host computer, the set of stored-value parameters from the identifier;

translating, with the stored-value host computer, the set of stored-value parameters into a value amount;

applying, with the stored-value host computer, at least a portion of the value amount to the transaction amount; and transmitting, from the stored-value host computer to the second point-of-sale terminal, a modified transaction amount as an amount to be used in effecting the second transaction.

2. The method recited in claim 1 further comprising transmitting the packet of transaction information from the loyalty host computer to the financial infrastructure with a request for authorization of the transaction.

3. The method recited in claim 1 further comprising transmitting a notification of the customer reward from the loyalty host computer to the first point-of-sale terminal.

4. The method recited in claim 1 wherein the second merchant is different from the first merchant.

5. The method recited in claim 1 wherein the qualifying aspects of the first transaction include item-level information that identifies specific items that form part of the first transaction.

6. The method recited in claim 1 wherein the qualifying aspects of the first transaction include item-level-type information that identifies specific types of items that form part of the first transaction.

7. The method recited in claim 1 wherein applying at least a portion of the value amount further defines a modified value amount, the method further comprising:
   translating, with the stored-value host computer, the modified value amount into a modified set of stored-value parameters; and
   updating the record of the stored-value parameters.

8. The method recited in claim 1 further comprising transmitting the transaction amount to the financial infrastructure with a request for authorization of the second transaction.

9. The method recited in claim 1 wherein the identified set of stored-value parameters consists of a single stored-value parameter.

10. A system for operating an integrated stored-value and loyalty program within a financial infrastructure, the system comprising:
   a loyalty host including a loyalty-host communications system, a loyalty-host processor, a loyalty-host storage device, and a loyalty-host computer-readable storage medium having a loyalty-host computer-readable program embodied therein; and
   a stored-value host including a stored-value-host communications system, a stored-value-host processor, a stored-value-host storage device, and a stored-value-host computer-readable storage medium having a stored-value host computer-readable program embodied therein,
   wherein the loyalty-host computer-readable program includes:
   instructions for receiving, with the loyalty-host communications system from a first point-of-sale terminal, an identifier and a packet of transaction information defining a first transaction between a first merchant and a customer;
   instructions for identifying, with the loyalty-host processor, qualifying aspects of the first transaction from the packet of transaction information;
   instructions for determining, with the loyalty-host processor, a customer reward from the identified qualifying aspects and a history of information defined by the identifier and stored on the storage device; and
   instructions for transmitting, with the loyalty-host communications system, information defining the reward to the stored-value host; and
   wherein the stored-value-host computer-readable program includes:
   instructions for determining, with the stored-value-host processor, a set of stored-value parameters from the information defining the reward;
   instructions for storing, on the stored-value-host storage device, the set of stored-value parameters as a record;
   instructions for receiving, with the stored-value-host communications system from a second point-of-sale terminal, the identifier and a transaction amount for a second transaction between a second merchant and the customer, wherein the second transaction is different from the first transaction and is initiated at a point in time later than the first transaction is initiated;
   instructions for identifying, with the stored-value-host processor, the set of stored- value parameters from the identifier;
   instructions for translating, with the stored-value-host processor, the set of stored-value parameters into a value amount;
   instructions for applying, with the stored-value-host processor, at least a portion of the value amount to the transaction amount; and
   instructions for transmitting, with the stored-value-host communications system to the second point-of-sale terminal, a modified transaction amount as an amount to be used in effecting the second transaction.

11. The system recited in claim 10 wherein the loyalty-host computer-readable program further includes instructions for transmitting, with the loyalty-host communications system, the packet of transaction information to the financial infrastructure with a request for authorization of the transaction.

12. The system recited in claim 10 wherein the loyalty-host computer-readable program further includes instructions for transmitting, with the loyalty-host communications system, a notification of the customer reward to the first point-of-sale terminal.

13. The system recited in claim 10 wherein the second merchant is different from the first merchant.

14. The system recited in claim 10 wherein the qualifying aspects of the first transaction include item-level information that identifies specific items that form part of the first transaction.

15. The system recited in claim 10 wherein the qualifying aspects of the first transaction include item-level information that identifies specific types of items that form part of the first transaction.

16. The system recited in claim 10 wherein the instructions for applying at least a portion of the value amount further includes instructions for defining a modified value amount, the stored-value-host computer-readable program further including:
   instructions for translating, with the stored-value-host processor, the modified value amount into a modified set of stored-value parameters; and
   instructions for updating the record of the stored-value parameters on the stored-value host storage device.

17. The system recited in claim 10 wherein the stored-value-host computer-readable program further includes instructions for transmitting, with the stored-value-host communications system, the transaction amount to the financial infrastructure with a request for authorization of the second transaction.

18. The system recited in claim 10 wherein the identified set of stored-value parameters consists of a single stored-value parameter.

* * * * *